March 22, 1955 A. M. REEVES 2,704,570
HEAVY DUTY TIRE REMOVER AND EXPANDER
Filed Sept. 25, 1953 3 Sheets-Sheet 1

INVENTOR.
ALBERT M. REEVES
BY
McMorrow, Berman + Davidson
ATTORNEYS

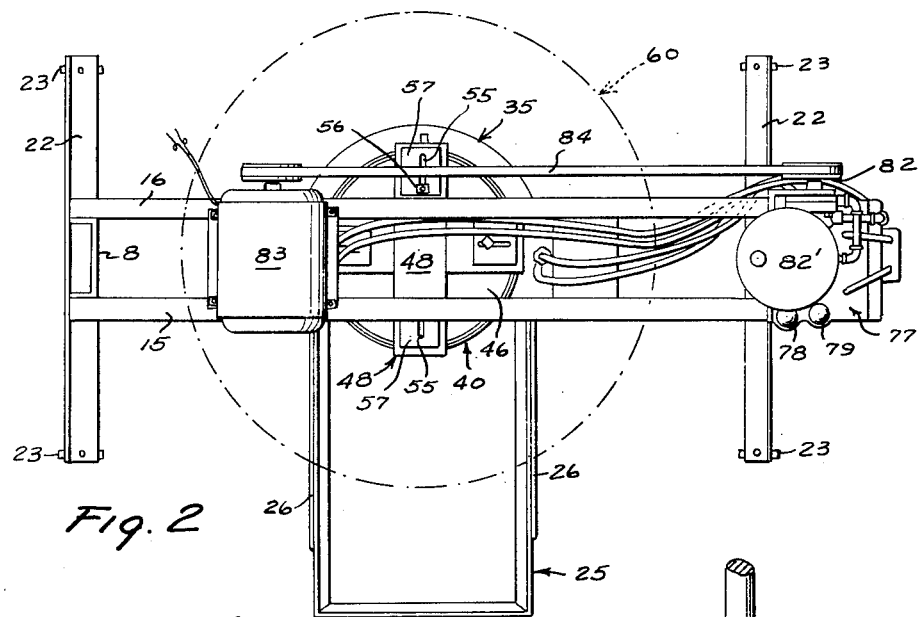
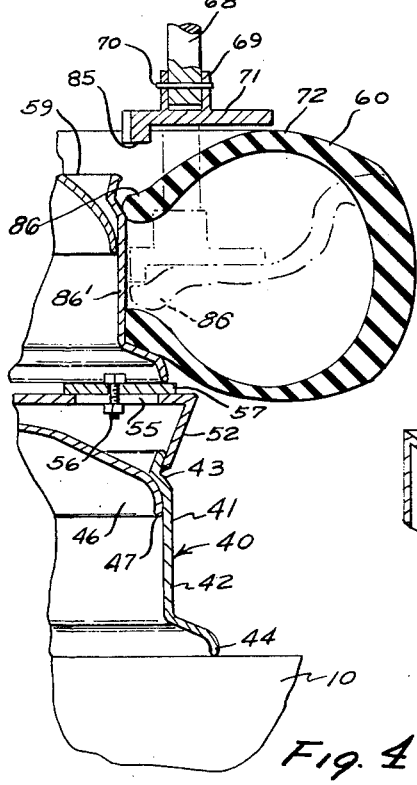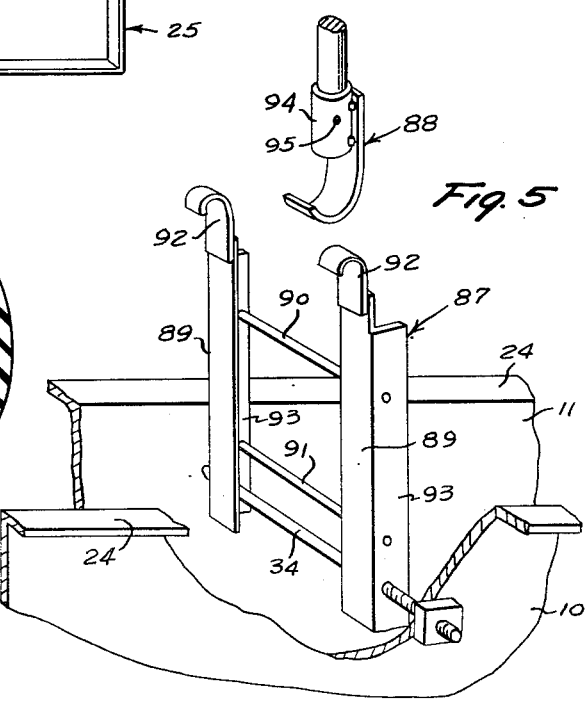

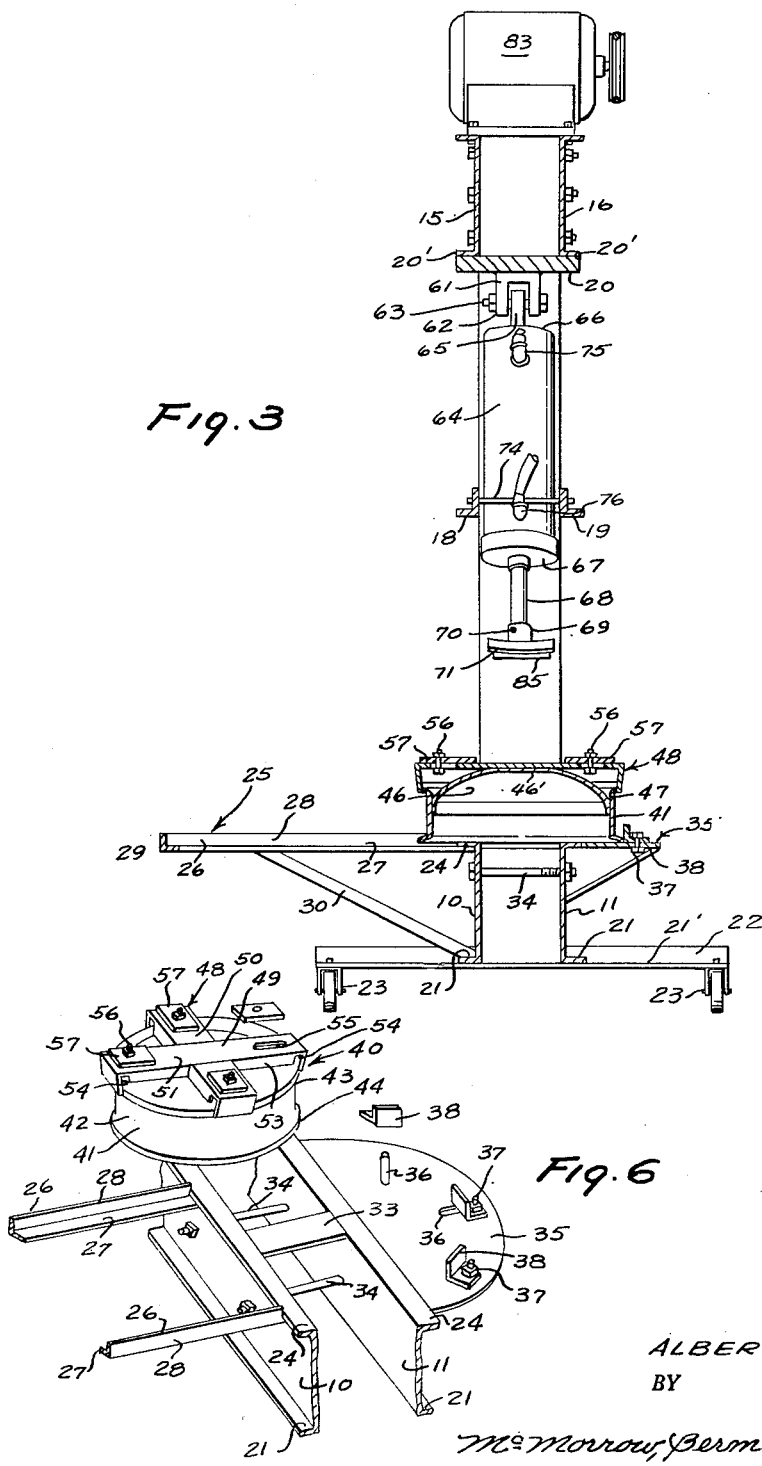

United States Patent Office 2,704,570
Patented Mar. 22, 1955

2,704,570

HEAVY DUTY TIRE REMOVER AND EXPANDER

Albert M. Reeves, Kingman, Kans.

Application September 25, 1953, Serial No. 382,334

2 Claims. (Cl. 157—1.2)

This invention relates to an improved hydraulically operated press for removing large tires, such as those employed on earth-moving machinery and heavy trucks, from wheel rims, and for expanding such tires, once removed, for purposes of inspection, removal of tubes therefrom, and repair if needed, the primary object of the invention being to provide an efficient and practical device of this kind which saves substantial work and time in the performance of the mentioned operations, and renders these operations much easier and accurate, so that damage to tires and tubes, otherwise likely to occur, can be reduced or eliminated.

Another important object of the invention is to provide a simple and rugged device of the character indicated above which can be made in a reliable, serviceable, and attractive form at relatively low cost.

Other important objects and advantages of the invention will be apparent from the following description and the accompanying drawings, wherein, for purposes of illustration only, a specific embodiment of the invention is set forth in detail.

Figure 2 is a top plan view;

Figure 3 is a transverse vertical section taken on the line 3—3 of Figure 1;

Figure 4 is an enlarged fragmentary transverse vertical section taken on the line 4—4 of Figure 1;

Figure 5 is a fragmentary perspective view showing parts of the tire spreading attachment; and Figure 6 is a fragmentary perspective and partially exploded view of tire supporting assembly.

Figure 1:
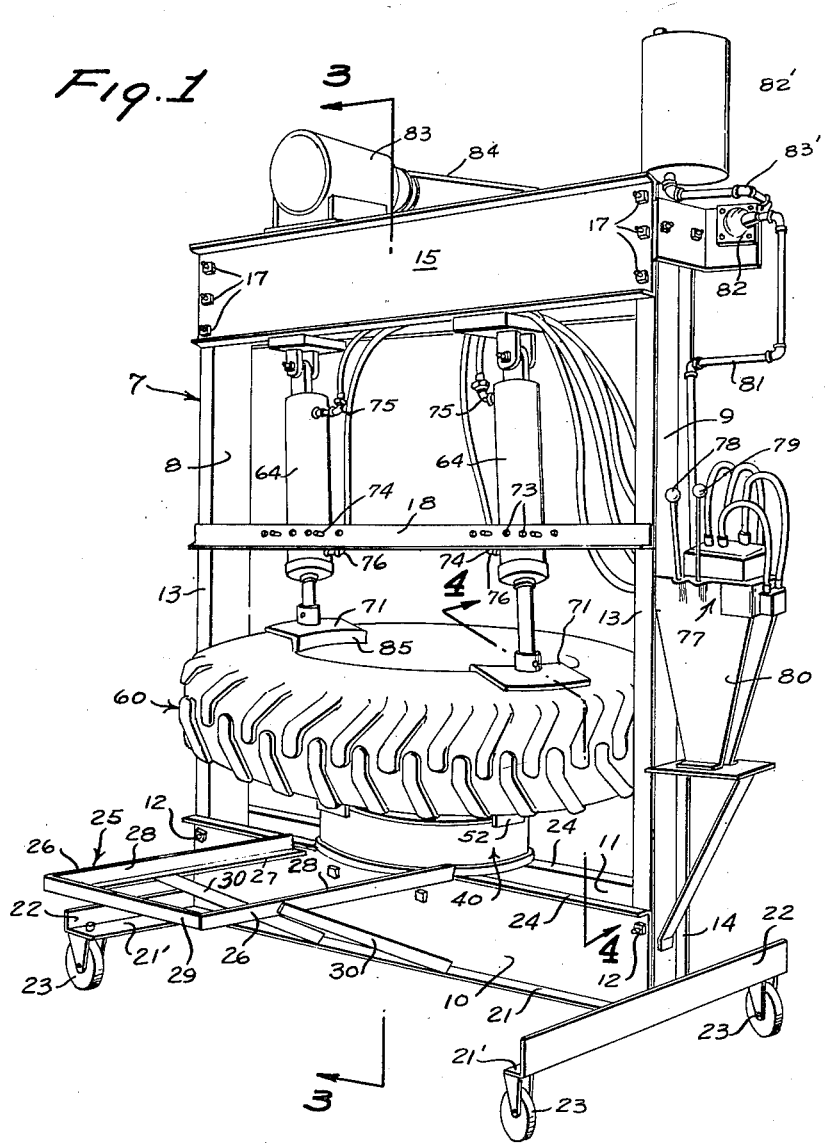
Figure 1 is a front perspective view.

Referring in detail to the drawings, wherein like numerals designate like parts throughout the several views, the illustrated device comprises an upright frame 7 comprising channel standards 8 and 9 with their open sides facing laterally outwardly, lower horizontal cross member channels 10 and 11, bolted, as indicated at 12, to front and rear flanges 13 and 14, respectively, of the standards 8 and 9 at the lower ends of the standards.

Upper channel cross members 15 and 16 extend between the upper ends of the standards and are secured to the front and rear flanges 13 and 14 by bolt means 17.

Front and rear horizontal hydraulic cylinder positioning bars 18 and 19, respectively, are secured in suitable manner to the front and rear standard flanges 13 and 14, at a level spaced from the upper cross members 15 and 16 and the lower cross members 10 and 11.

A relatively heavy and rigid bolster plate 20 is secured by suitable means to the undersides of the lower flanges 20', 20' of the upper cross members 15 and 16 and extends between standards 8 and 9.

The lower ends of the standards 8 and 9 and the lower flanges 21, 21 of the lower cross members 10 and 11 rest upon and are secured by suitable means upon the laterally inwardly projecting flanges 21', 21', at the middles of the flanges, of transverse horizontal single iron feet 22, 22, which has ground engaging caster wheels 23, 23 at their opposite ends.

The upper flanges 24, 24 of the lower cross members 10 and 11 constitute rests for a wheel adapter as hereinafter described.

Extending forwardly from the forward lower cross member 10 is a horizontal loading and guiding platform or slide 25 which comprises side angle iron members 26, 26 having inwardly directed horizontal flanges 27, 27 and upright flanges 28, 28. An angle iron cross member 29 extends between and is fixed to the forward ends of the side members 26; and diagonal braces 30, 30 are secured at their elevated ends by suitable means to the side members 26, 26 and at their depressed ends to the lower flange 21 of the front lower cross member 10.

A brace plate or web 33 extends between and is secured at it ends to the facing sides of the lower cross members 10 and 11 at a level below their upper edges and at a point midway between the standards 8 and 9.

Laterally spaced bolts 34, 34 traverse the webs of the lower cross members 10 and 11 at opposite sides of the brace plate 33.

Fixed to and extending rearwardly from the lower rear cross member 11 on a level with the upper flange 24 thereof is a semi-circular adapter supporting plate 35 having therein a plurality of equally circumferentially spaced radial slots, which are provided to accommodate removable bolts 37 for securing angle lugs 38 in adjustable positions on the plate 35.

An adapter, generally designated at 40 comprises an annulus 41 having a concave radially outward side 42 providing radially outwardly projecting upper and lower annular flanges 43 and 44, respectively, the lower flange 44 being arranged to slide upon the horizontal flanges 27, 27 of side members 26, 26 of the slide 25 and to bear slidably against the vertical flanges 28 thereof, so that the adapter 40 is guided easily and accurately as it is pushed rearwardly along the slide 25 to an accurately centered position on the adapter supporting plate 35 and the tops of the lower frame cross members 10 and 11, as shown in Figures 1, 2 and 3.

An upwardly dished supporting dome 46 has a peripheral edge 47 secured to the inner side of the annulus at a point just below the upper flange 43, and the apex 46' of the dome 46 is at a level spaced above the upper flange 43, as shown in Figure 3.

A cruciform wheel support, generally designated 48 comprises two inverted, crossed and intersecting channel bars 49 and 50 whose webs 51 terminate in downturned lugs 52 and with the side flanges 53, 53 provided with notches 54, 54 adjacent to the lugs 52. As shown in Figure 6, the notches 54, 54 engage over the upper end of the annulus 41 with the lugs 52 engaging the outer edge of the upper annulus flange 43. The opposite ends of the webs 51 have therein longitudinally elongated slots 55, passing bolts 56 which traverse adjustable rest plates 57. The dome apex 46' is in supporting relation to the center of the cruciform 48.

As shown in Figure 3, the adapter 40 is adapted to be supportably centered relative to the lower frame cross members 10 and 11 and to the adapter supporting plate 35, with the back of the annulus 41 engaged with the angle lugs 38 on the plate 35, which are adjusted along the slots 36 according to the diameter of a wheel 59 from which a tire 60 is to be removed.

Secured to and depending from the bolster plate 20 at equally spaced points from the standards 8 and 9 are brackets 61, 61 which include clevises 62, 62 traversed by pivot pins 63, 63.

Depending two-way hydraulic cylinders 64, 64 have lugs 65,65 on their upper ends 66, 66 which are supportably pivoted on the pins 63, 63. The cylinders 64, 64 have closed lower ends 67, 67 from which depends piston rods 68, 68 on whose lower ends are circumposed adapter collars 69, 69 secured rearwardly in place by pins 70, 70, pressure plates 71, 71 being secured to the collars 69, 69 for downward pressure upon the top side wall 72 of a tire 60 resting upon the plates 57 on the adapter 40, as shown in Figures 1 and 4.

The positioning bars 18, 19 have longitudinally spaced holes 73 for reception of positioning pins 74 on lower parts of the cylinders 64, 64 whereby the cylinders 64, 64 are held in proper position to place the pressure plates 71 in engagement with tires 60 of different diameters.

Hydraulic pipes 75 and 76 are connected to the cylinders 64, 64 at their upper and lower ends 66 and 67, respectively, and lead thereto from a four-way control valve 77 having a push producing lever 78 and pull-producing lever 79, the valve 77 being supported on the standard 9 by a bracket 80. Leading to the control valve 77 is a pressure pipe 81 which is connected to a rotary pump 82 mounted on the upper end of the standard 9 and connected to an electric motor 83 by a belt 84. A fluid reservoir 82' is connected by a pipe 83' to the pump 82.

Operating the lever 78 from closed position produces downward or pushing movement of the cylinder piston rods, and operating the lever 79 from closed position produces upward or pulling movement of the piston rods.

As shown in Figure 4, the radially inward edges of the pressure plates 71 have depending ribs or flanges 85 which are provided to make initial loosening contact with the bead 86 of the tire side wall 72, close to the rim 86' in advance of collapse of the tire side wall 72, as shown in dotted lines.

For spreading the side walls of a tire 60 for removing a tube (not shown) therefrom and for facilitating inspection of the interior of the tire 60, lower hook assemblies 87 and upper hooks 88 are provided.

The lower hook assemblies 87 comprise angle iron uprights 89, 89 spaced and connected by cross rods 90 and 91 and provided with hooks 92, 92 on their upper ends. The above mentioned bolts 34, 34 which extend between the lower frame cross members 10 and 11, are utilized to secure the assemblies 87, 87 in operative positions on the frame at opposite sides of the adapter 35, the bolts 34, 34 being passed through holes provided in the flanges 93, 93 of the assemblies 87, 87, as shown in Figure 5.

The push plate collars 69 are removed from the piston rods 68 and are then replaced with collars 94, to which are fixed depending hooks 88, and pins 95 secure the collars 94 in place.

With this arrangement the lower hooks 92 are engaged over the lower bead of a tire at opposite sides thereof and the upper hooks 88 are engaged around the upper bead of the tire at similar opposite sides thereof, and the hydraulic cylinders 64 then are operated to pull the upper hooks 88 upwardly so as to spread the tire side walls apart.

What is claimed is:

1. In a tire removing device, a vertical frame having ground-engaging means, an upper cross member, a lower cross member, an adapter removably resting upon said lower cross member for supportably engaging the underside of a wheel from which a tire is to be separated, hydraulic cylinder means mounted on and depending from said upper cross member, said cylinder means having piston rod means depending therefrom, pressure plate means on said piston rod means for pressing downwardly upon the upper side of a tire resting upon said adapter, and hydraulic means connected to said cylinder means for forcing the pressure plate means downwardly in contact with the upper side of a tire and for elevating the pressure plate means out of contact with the upper side of a tire, said hydraulic cylinder means comprising a pair of hydraulic cylinders spaced along said upper cross member and pivoted on the upper cross member to swing toward and away from each other, and positioning bar means on said frame between said upper and lower cross members selectively attachable to said cylinders to position said pressure plate means to engage tires of different diameters.

2. In a tire removing device, a vertical frame having ground-engaging means, an upper cross member, a lower cross member, an adapter removably resting upon said lower cross member for supportably engaging the underside of a wheel from which a tire is to be separated, hydraulic cylinder means mounted on and depending from said upper cross member, said cylinder means having piston rod means depending therefrom, pressure plate means on said piston rod means for pressing downwardly upon the upper side of a tire resting upon said adapter, and hydraulic means connected to said cylinder means for forcing the pressure plate means downwardly in contact with the upper side of a tire and for elevating the pressure plate means out of contact with the upper side of a tire, said hydraulic cylinder means comprising a pair of hydraulic cylinders spaced along said upper cross member and pivoted on the upper cross member to swing toward and away from each other, and positioning bar means on said frame between said upper and lower cross members, said positioning bar means having longitudinally spaced positioning openings and said cylinders having positioning pins engageable in selected ones of the positioning openings so as to position said pressure plate means to engage tires of different diameters.

References Cited in the file of this patent

UNITED STATES PATENTS

| | | |
|---|---|---|
| 2,233,371 | Smith | Feb. 25, 1941 |
| 2,345,346 | Larson | Mar. 28, 1944 |
| 2,473,571 | Cook | June 21, 1949 |
| 2,479,432 | Tillotson | Aug. 16, 1949 |
| 2,536,139 | Ritter | Jan. 2, 1951 |
| 2,618,320 | Deysher et al. | Nov. 18, 1952 |